United States Patent [19]

Pratt

[11] Patent Number: 4,655,671
[45] Date of Patent: Apr. 7, 1987

[54] LOADING AND UNLOADING DEVICE

[76] Inventor: Stephen C. Pratt, 37 Arabana Street, Aranda, Canberra A.C.T. 2614, Australia

[21] Appl. No.: 631,870

[22] Filed: Jul. 18, 1984

[30] Foreign Application Priority Data

Jan. 11, 1984 [AU] Australia .............................. PG3151

[51] Int. Cl.⁴ .............................................. B65G 67/02
[52] U.S. Cl. ..................................... 414/477; 414/480; 414/498; 414/537; 414/538
[58] Field of Search ............... 414/477, 478, 479, 480, 414/491, 494, 498, 500, 537, 538

[56] References Cited

U.S. PATENT DOCUMENTS

| 2,082,663 | 6/1937 | Slater | 414/477 |
| 2,418,567 | 4/1947 | Ausherman | 414/480 |
| 2,613,827 | 10/1952 | Van Doorne | 414/491 |
| 2,830,717 | 4/1958 | Posey | 414/500 X |
| 3,357,581 | 12/1967 | Scott | 414/478 |
| 3,480,166 | 11/1969 | Abott | 414/538 X |
| 3,809,266 | 5/1974 | Salerni | 414/538 X |
| 4,286,346 | 9/1981 | Wiek | 414/477 X |
| 4,601,632 | 7/1986 | Agee | 414/537 |

FOREIGN PATENT DOCUMENTS 28792 5/1957 Finland .............................. 414/639

Primary Examiner—Robert J. Spar
Assistant Examiner—Stuart J. Millman
Attorney, Agent, or Firm—Balogh, Osann, Kramer, Dvorak, Genova & Traub

[57] ABSTRACT

The invention describes a road trailer which functions in a way similar to a mobile slipway whereby a craft may be moved into and from a body of water along a ramp on a wheeled cradle.

1 Claim, 4 Drawing Figures

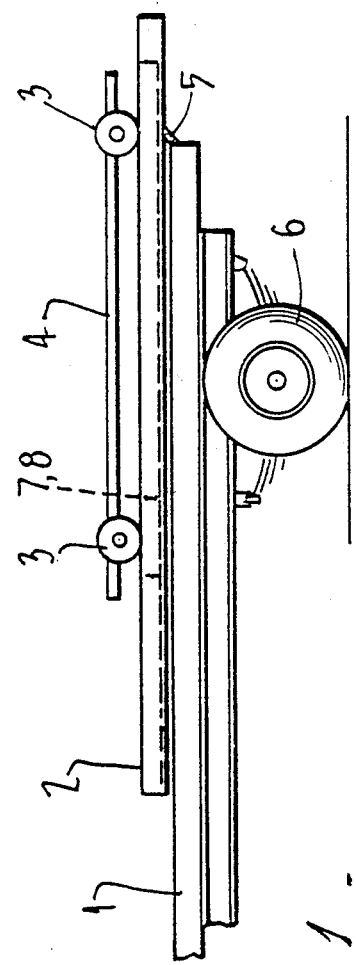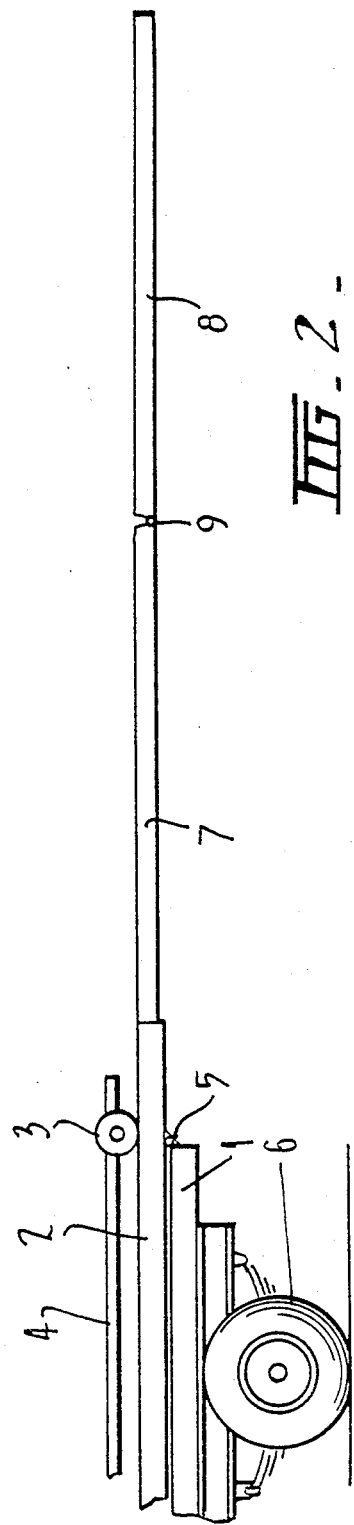

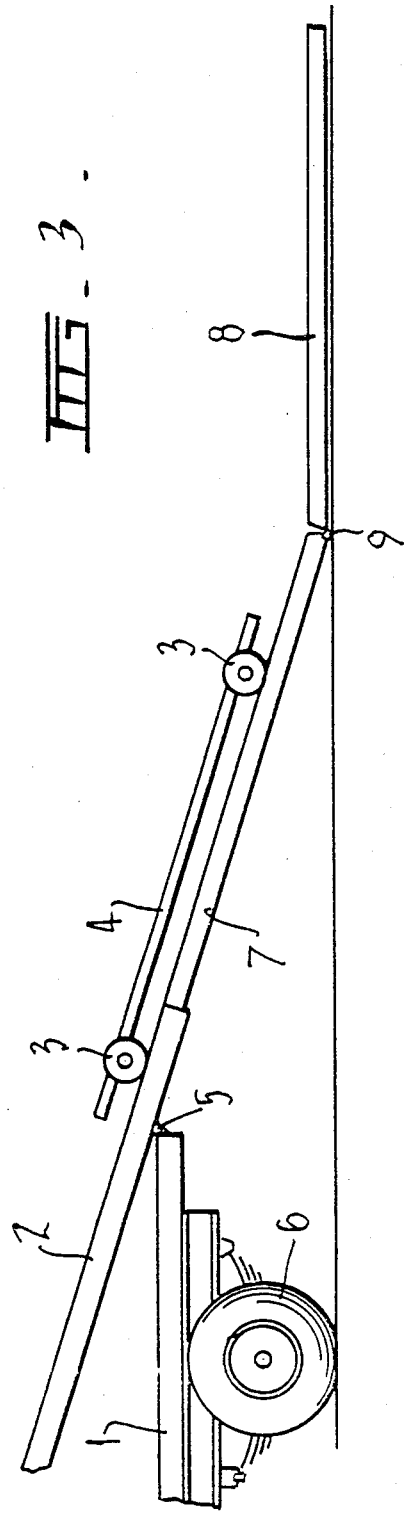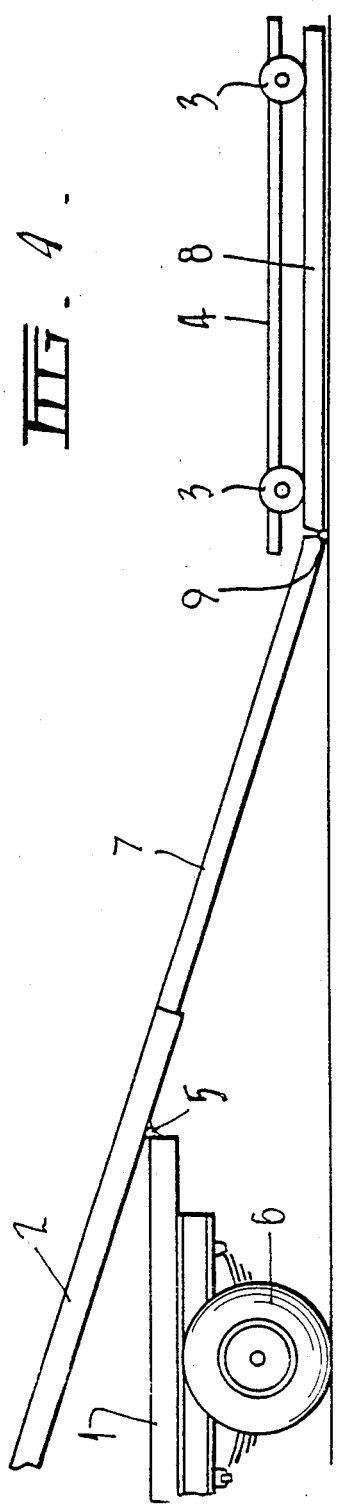

LOADING AND UNLOADING DEVICE

FIELD OF THE INVENTION

The device of this invention concerns a road trailer, fitted to function like a mobile slipway, enabling a craft to be moved to and from the water along a ramp on a wheeled cradle. As described below, however, the device could be employed in more general load-handling applications. The device has been developed primarily to facilitate the transportation, launching and recovery of boats of all types, but particularly yachts, motor craft and the like, which may need to be launched into or recovered from relatively deep water, and/or which are heavy or for any other reason difficult to handle with existing types of equipment.

The principle of the device of this invention may also be readily applied to the loading and unloading of large, heavy or otherwise awkward loads to or from suitably fitted trucks or trailers. For example, the handling of containers, large crates or heavy machinery at remote locations where suitable ramps, cranes or other similar equipment are unlikely to be available. In the descriptions which follow, such a load may be read as substituted where the text or drawings deal with the handling of a boat.

DESCRIPTION OF THE PRIOR ART

U.S. Pat. No. 2,711,259 issued June 21, 1955 describes a transportation and launching trailer for a boat of the inboard type. In more detail this specification describes an elongated frame having front and rear ends, a pair of ground-engaging wheels on and depending from the frame at a point spaced from the ends, said frame having tracks extending along opposite sides thereof, a boat cradle having front and rear ends, front track-engaging wheels depending from a forward part of the cradle, rear track-engaging wheels depending from a rearward part of the cradle, the front and rear cradle-wheels supporting the cradle on the frame and providing for rearward movement of the cradle from a forward frame supported position to a rearward cradle-unloading position off the rear end of the frame wherein the rear track-engaging wheels rest upon the ground, winch means on the front end of the frame including a cable connected to the front end of the cradle, and means for operating the winch means to draw the cradle forwards from a rearward cradle-unloading position to its forward frame supported position, forward block means on a forward part of the tracks, the forward block means comprising ramp means, the ramp means serving to engage and elevate parts of the front track-engaging wheels and elevate the front track-engaging wheels onto the front block means as the cradle is moved into supported position with the front track engaging wheels elevated above the tracks.

SUMMARY OF THE INVENTION

The launching and recovery of large trailable boats, whether yachts or motor craft, presents a number of problems, given existing trailer design and associated launching/recovery techniques.

These problems include:

1. When launching, the difficulty of getting the craft into a sufficient depth of water to enable it to float;
2. When recovering, the difficulty of either getting the trailer into a sufficient depth of water to enable the boat up out of the water onto the trailer; for smaller, lighter craft the problems are eased by the use of the tilt trailer design, but as this method normally requires at least the bow of the boat to be initially lifted onto the tilting section, it becomes rapidly less practicable as the craft increases in size;
3. Especially when recovering, the difficulty of keeping the boat square to the trailer (i.e. in line with the rollers, etc.) in a crosswind or current, which will persistently tend to slew the stern of the boat;
4. The significant potential for damage to the hull of the vessel, especially if it has a pronounced keel or veebottom, due to the difficulty of ensuring vertical stability throughout the launch/recovery operation, when running on keel rollers; bilge and/or topside rollers, designed to try to overcome this problem, suffer from the disadvantage of the difficulty in maintaining consistent support, because of the fact that a boat varies in shape and cross-section from bow to stern;
5. Whether launching or recovering, difficulties associated with the submergence, particularly in sea water, of the trailer's road wheels and bearings, brakes and electrics.

The difficulties enumerated, particularly in 1, 2 and 3 above, contribute to making the launching and especially the recovery of large trailable craft a time-consuming and difficult operation, which is frequently physically demanding and is potentially injurious to persons and property.

It is a primary object of this invention to provide a device which overcomes each of the difficulties adverted to by moving the craft into and out of the water on a wheeled cradle, which runs on a ramp, which in turn is a rearward retractable or removeable extension of the trailer. That is, it is an active device, rather than passive as is generally the case with present boat trailer design;

with a ramp of suitable length and design, the craft may be floated onto or off the cradle without having to put the trailer wheels etc. under water;

apart from the benefits of not submerging the trailer, this makes the whole operation of launching and especially recovery quicker, easier and safer, eliminating any need to lift the boat;

while the craft is within the confines of the cradle, it is effectively restrained from unwanted (especially sideways) movement;

the use of the cradle to move the craft to and from the water means that it is properly supported at all times, and in particular is unable to tilt or fall over sideways.

Additional advantages include:

1. A single basic road trailer design may be used in conjunction with different cradles, or different cradle conformations, to accommodate boats with widely differing characteristics.
2. If required, the cradle may be run right off the end of the ramp, to park the boat, for example, and then, if needed, the trailer is available for use with another boat and cradle. (This capability may be especially relevant when considering the possible alternative application to more general load handling, where the load, rather than being carried on a specially shaped cradle, could be mounted on a simple and inexpensive bogey.)
3. The cradle or bogey may itself, if desired, be fitted with a drawbar and simple steerable wheels, to enable maneuvering within a parking area, or on a site.

4. The boat may be readily repositioned on the trailer, to facilitate work on the underside of the hull, for example.

5. The winch cable may be attached to the cradle, rather than the boat, with significant advantages from the points of view of safety, possible damage to the hull, and hull construction.

6. Certain boat-transporting road trailer design problems are simplified, because the weight of the boat is supported at the sides of the trailer, rather than along its central axis.

7. The hull of the boat may be supported on a springy or cushioned base, if desired, and the weight spread over relatively large bearing surfaces.

BRIEF DESCRIPTION OF THE SEVERAL VIEWS OF THE DRAWINGS

A better understanding of this invention may be obtained from the accompanying drawings in which: FIG. 1 shows the cradle or trolley in its normal position for travelling or storage, resting on the pivoting section, which in turn is in the horizontal position; the ramp has been removed or retracted. FIG. 2 shows the ramp attached to the pivoting section but held in the horizontal position. FIG. 3 shows the ramp in its lowered position, with the cradle moving up or down. FIG. 4 similar to FIG. 3, but the cradle is fully lowered.

DETAILED DESCRIPTION

In the drawings the device of the invention is shown as comprising a trailer 1 with one or more pairs of road wheels 6 and having a suitable suspension and a drawbar system for hitching to a towing vehicle.

The chassis of the trailer 1 preferably consists of a pair of side members parallel at their rearward portions but meeting at their forward points at the drawbar. Suitable cross-bracing is provided.

Attached to the chassis is a pivoting, or tilting, section 2 consisting of two parallel side members, with appropriate cross-bracing. This section normally (that is, when the device is not actually in use for launching or recovery) rests inside the chassis side members, but protrudes somewhat beyond their rearmost ends, to which it is attached by hinges or pivoting points 5.

A ramp 7, 8 is designed so as to be capable of sliding forwards (retracting) into the main body of the trailer 1, or rearwards to form an extension of the pivoting section 2. When in the latter position it becomes a downward-sloping ramp when the pivoting section 2 is rotated about the hinges 5 which connect it to the chassis.

The ramp 7, 8 is, in turn, hinged at a suitable point, preferably at or about halfway along its length at 9, in such a way that its rear part will rotate upwards in relation to the line of the forward part, but not downward. The result of this is that, when the pivoting section 2 is in its normal, non-rotated, position resting inside the chassis side members, the ramp 7, 8, if extended rearward, projects horizontally out behind the trailer 1 so that, for example, the trailer 1 may be maneuvered or re-positioned without the problems that might be caused were the ramp 7, 8 to drag on the ground. When the pivoting section 2 is rotated and the ramp 7, 8 is lowered, however, the whole of its rear part 8, as far forward as the hinges 9, rests on the ground or launching ramp.

This hinged construction has a number of advantages over the alternative, rigid form, especially when the device is being used to handle large and/or heavy craft, or craft requiring relatively deep water to float, or when it is being used on a launching area with a shallow slope. These include:

1. The unsupported length of the ramp 7, 8 is considerably reduced, making it possible to reduce the section of the material used (and therefore the weight), because of the lesser bending moments. Alternatively, a heavier craft or load can be safely handled with a ramp constructed of material of a given strength.

2. The rear, or lower, part 8 of the ramp may be of lighter material still, if required, because when under load, it is resting on the surface of the launching ramp or beach.

3. The overall length of the ramp 7, 8 required to enable a given craft to float onto or off the cradle is reduced, because the cradle 4 is run more directly down to the level of the beach or launching ramp, and then along that level—and therefore making maximum use of the depth of water available—rather than running down a rigid ramp which will only reach the level of the beach or launching ramp at its extreme end, thus 'wasting' water depth.

The final major element of the device is a wheeled cradle 4, preferably designed to accept and firmly support the vessel for which the trailer is to be used. This cradle 4 is fitted with two or more pairs of wheels 3 and is designed so that it may run upon the pivoting section 2 and and the ramp 7, 8. When not actually launching or recovering the craft, the cradle 4, whether or not loaded, normally rests upon the pivoting section 2.

For launching, the trailer 1 is reversed to the water's edge, where the ramp 7, 8 is extended rearwards so that it projects out over the wat.er. After releasing any locking or restraining devices, the cradle 4 is then allowed to run backwards, along the pivoting section 2 and onto the ramp portion 7 first, then 8.

As the cradle 4 passes the point of balance of the unit comprising the pivoting section 2 and the ramp 7, 8, that unit will rotate until the rear or lower part of the ramp 8 rests on the surface of the launching area. The cradle 4 is then run down the length of the ramp 7, 8 until the craft starts to float off. With heavy craft, control may be readily exercised by means of a winch.

The boat may now be floated out of the cradle, the cradle pulled back up the ramp 7, 8 to its position on the pivoting section 2 rotated back to its 'rest' position on the chassis, thus lifting the ramp 7, 8 towards the horizontal. The ramp 7, 8 is then retracted into the trailer 1, which may then be towed away.

In recovery, the trailer 1 is again backed to the water's edge, the ramp 7, 8 extended to project out over the water, the cradle run down to the end of the ramp 7, 8 (which will again be automatically lowered as the point of balance is passed), and the boat is floated on and made fast. The cradle 4, now containing the boat, is then pulled up the ramp 7, 8 and, once again, as the point of balance is passed, the pivoting section reverts to its normal position and the ramp 7, 8 is raised. The ramp 7, 8 is then retracted and the trailer 1, with boat now loaded, may be towed away. It is emphasised that the above description of the design and construction of the device is to be understood to be a preferred version and not restrictive of the general scope of the invention.

I claim:

1. A device for the transportation, launching and recovering of boats, said device comprising a wheeled first sub-frame having means at the forward end thereof for affixing a towing hitch, a second sub-frame mounted upon said first sub-frame, said second sub-frame pivotally mounted to said first sub-frame about an axis transverse thereto and located adjacent the rear end thereof, a ramp suitably mounted to said second sub-frame to be extendible and retractable thereof in the direction longitudinally of said wheeled first sub-frame, a wheeled cradle assembly mounted upon said second sub-frame to be mobile thereon and on said ramp when expanded in the direction longitudinal of said wheeled first sub-frame, said cradle adapted to support a boat, whereby moving the cradle rearwardly in use causes said second sub-frame and ramp to pivot with the rearward end of the ramp moving downwardly whereby for launching or recovering a boat from or to said cradle, and moving the cradle forwardly after recovery of a boat causes said second sub-frame and ramp to pivot such that the rearward end of the ramp moves upwardly whereby said second sub-frame sits in transport position on said first sub-frame, a rear portion of said ramp being formed of material of reduced weight and being hinged to the portion forwardly thereof whereby to pivot upwardly but not downwardly in relation to the forward portion about a transverse axis so that, in operation, said rear portion can lie flat on a ground suface with the portion forwardly thereof being in inclined position.

* * * * *